Patented Aug. 31, 1954

2,688,020

UNITED STATES PATENT OFFICE 2,688,020

PREPARATION OF DIHYDROURACILS

Johnstone S. Mackay, Old Greenwich, and Simon Frank, Stamford, Conn., assignors to American Cyanamid Company, New York, N. Y., a corporation of Maine No Drawing. Application January 17, 1952,
Serial No. 267,006

9 Claims. (Cl. 260—260)

1

The present invention is directed to the reaction of an acrylamide sulfate with urea to form a dihydrouracil.

While the precise mechanism of the reaction is not clearly understood, the overall reaction proceeds at least in part as follows:

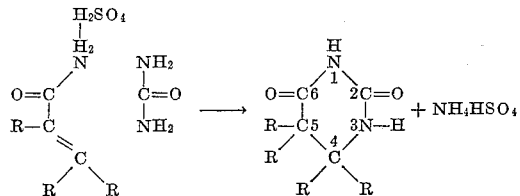

In the above equation R represents hydrogen or alkyl, and the R's can be the same or different.

The following examples illustrate without limiting the invention.

Example 1

Urea (25 g.) and acrylamide sulfate,

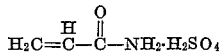

50 g., are fused together in a beaker, over the open flame, withdrawn from time to time so that the exothermic reaction does not bring the temperature of the mass over 180° C. (preferably not over 140° C.). As the temperature approaches 135° C., some gaseous ebullition occurs, principally ammonia. The reaction is complete in about 15–20 minutes, after which the reaction mass is allowed to cool and solidify. It is then broken up and dissolved in hot water (50–80° C.) and filtered hot. On cooling, the filtrate deposits characteristic crystals of dihydrouracil, M. P. 272–273° C. in a yield of about 26%.

When the reaction is conducted in a solvent, e. g., water, xylene, the glycol mono- and diethers and the like, the exothermic reaction is easier to control, and the yield is greater, as shown in the following example.

Example 2

A hot solution of 50 g. of urea in 20 ml. of water was added to 103 g. (0.6 mole) of acrylamide sulfate at 135° C. This mixture was stirred and held at 135° C. for ½ hour giving a thick slurry. After cooling to room temperature it was dissolved in 50 ml. of hot water and filtered hot. On cooling, the filtrate deposited white crystals of dihydrouracil. By-product ammonium bisulfate remained in solution. An approximate yield of 50% of recovered product was obtained.

2

Example 3

One mole of urea was dissolved in 30 ml. of hot water (about 65° C.) and the solution added to 0.75 mole of α-methylacrylamide sulfate. The resultant slurry was heated gradually to 135–140° C., with stirring, which required about 10 minutes, and the reaction mass was maintained at this temperature for an additional 20 minutes, after which it was allowed to cool. The resultant mass was dissolved in 70 ml. of hot water and filtered hot. On cooling, 5-methyldihydrouracil crystallized from the filtrate in a yield of about 32%.

Example 4

One mole of urea was reacted with 0.85 mole of β-methylacrylamide sulfate (prepared in the usual way from crotononitrile and sulfuric acid), following the procedure of the preceding example. The yield of 4-methyldihydrouracil was about 40%.

Example 5

One mole of urea was reacted with 0.75 mole of α,β-diethylacrylamide sulfate substantially as in Example 3, giving a 27% yield of 4,5-diethylhydrouracil.

In general, the urea:acrylamide compound mole ratio of 1–10:1–10 can be employed in the process of this invention. However, it is preferred that urea be in excess. It is still further preferred that the reaction be conducted in the presence of an inert diluent as above described. Water is the preferred diluent.

The temperature can range from 120–180° C., but is preferably 130–140° C.

Acrylamide sulfate can be prepared conveniently as follows:

53 parts of acrylonitrile are added dropwise over a period of 50 minutes to 116 parts of 84.5% sulfuric acid containing 0.2 part of copper powder (as a polymerization inhibitor) maintained at about 100° C. in a vessel equipped with a stirrer and a reflux condenser. After adding the nitrile, the mixture is heated at 100° C. for 45 minutes, then cooled to room temperature.

On cooling the mass "sets" to a solid mass of acrylamide sulfate crystals.

The alkyl substituted acrylamide sulfates can also be prepared from the substituted acrylamide in the above manner.

In addition to the substituted acrylamide of the preceding examples, the following are also suitable in the preparation of the corresponding dihydrouracil, by the process of this invention.

The preparation is preferably conducted substantially as in Example 3.

| Substituted acrylamide | Resultant substituted dihydrouracil |
|---|---|
| α,β-dimethylacrylamide sulfate | 4,5-dimethyldihydrouracil. |
| α,β,β-trimethylacrylamide sulfate | 4,4,5-trimethyldihydrouracil. |
| β-ethylacrylamide sulfate | 4-ethyldihydrouracil. |
| β,β-dimethylacrylamide sulfate | 4,4-dimethyldihydrouracil. |
| α-octylacrylamide sulfate | 5-octyldihydrouracil. |

While the invention has been described with particular reference to specific embodiments, it is to be understood that it is not to be limited thereto but is to be construed broadly and restricted solely by the scope of the appended claims.

We claim:

1. The method of treating urea with an acrylamide sulfate of the formula

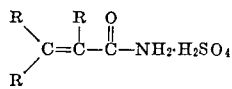

in which R is a member of the group consisting of H and lower alkyl at 120–180° C., whereby the corresponding dihydrouracil is formed.

2. The method according to claim 1 in which the reaction is conducted in the presence of an inert diluent.

3. The method of preparing dihydrouracil that comprises subjecting urea to the action of an acrylamide sulfate of the formula

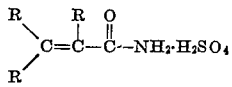

in which R is a member of the group consisting of H and lower alkyl at a temperature of 130–140° C.

4. The method according to claim 3 in which the diluent is water.

5. The method according to claim 1 in which the acrylamide reactant is acrylamide sulfate, $CH_2=CHCONH_2 \cdot H_2SO_4$.

6. The method of preparing dihydrouracil that comprises treating acrylamide sulfate with an excess of urea in aqueous solution at a temperature of about 130–140° C., dissolving the resulting reaction mass in water, filtering, and crystallizing dihydrouracil from the cooled filtrate.

7. The method of preparing 5-methyldihydrouracil that comprises subjecting urea to the action of α-methylacrylamide sulfate in water at 130–140° C.

8. The method of preparing 4-methyldihydrouracil that comprises subjecting urea to the action of β-methylacrylamide sulfate in water at 130–140° C.

9. The method of preparing 4,5-diethyldihydrouracil that comprises subjecting urea to the action of α,β-diethylacrylamide sulfate in water at 130–140° C.

References Cited in the file of this patent

Fischer et al., "Berichte Deutsche Chemische Gesillschaft," vol. 34, pp. 3751–3763.

Philippe et al., "Monatshefte fur Chemie," vol. 36, pp. 97–111.